(12) United States Patent
Locricchio

(10) Patent No.: US 11,910,950 B2
(45) Date of Patent: Feb. 27, 2024

(54) AUTOMATIC EGG COOKER

(71) Applicant: Lou Van Enterprise Inc., Atlanta, GA (US)

(72) Inventor: Louis Gerard Locricchio, Atlanta, GA (US)

(73) Assignee: Lou Van Enterprise Inc., Atlanta, GA (US)

( * ) Notice: Subject to any disclaimer, the term of this patent is extended or adjusted under 35 U.S.C. 154(b) by 0 days.

(21) Appl. No.: 16/979,213

(22) PCT Filed: Sep. 8, 2020

(86) PCT No.: PCT/US2020/049676
§ 371 (c)(1),
(2) Date: Sep. 9, 2020

(87) PCT Pub. No.: WO2021/050415
PCT Pub. Date: Mar. 18, 2021

(65) Prior Publication Data
US 2023/0097972 A1    Mar. 30, 2023

Related U.S. Application Data

(60) Provisional application No. 62/899,815, filed on Sep. 13, 2019.

(51) Int. Cl.
*A47J 29/02*    (2006.01)
(52) U.S. Cl.
CPC .................................... *A47J 29/02* (2013.01)
(58) Field of Classification Search
None
See application file for complete search history.

(56) References Cited

U.S. PATENT DOCUMENTS

| | | |
|---|---|---|
| 2,670,674 A | 8/1949 | Whitsel |
| 2,517,167 A | 8/1950 | Bemis |
| 2,761,375 A | 9/1956 | Jepson |
| 3,396,655 A | 8/1968 | Yoshida et al. |

(Continued)

FOREIGN PATENT DOCUMENTS

| | | | | |
|---|---|---|---|---|
| CN | 109965665 A | * | 7/2019 | ............ A47J 27/004 |
| KR | 101965359 B1 | * | 8/2019 | ............ A47J 27/002 |

OTHER PUBLICATIONS

Machine translation of CN 109965665 A performed on Apr. 25, 2023, Yang et al. (Year: 2019).*

(Continued)

*Primary Examiner* — Dana Ross
*Assistant Examiner* — Kevin Guanhua Wen
(74) *Attorney, Agent, or Firm* — Bryan W. Bockhop; Bockhop Intellectual Property Law, LLC

(57) ABSTRACT

A device for cooking eggs includes a frame, a support unit, a first burner, a top unit, a second burner, a motor unit and a control unit. The support unit defines a recess into which the pan fits. The first burner is adjacent to the recess. The top unit is attached to the support unit and defies a second recess. The second burner is adjacent to the second recess. The motor unit rotates the pan in response to a command. The control unit receives a desired recipe input from a user interface and generates commands that cause the motor unit to operate according to the desired recipe indicated by the input.

16 Claims, 7 Drawing Sheets

(56) References Cited

U.S. PATENT DOCUMENTS

| | | | |
|---|---|---|---|
| 4,276,820 A | 7/1981 | Joannou | |
| 6,578,469 B2 | 7/2003 | Sharpe | |
| 7,180,034 B1* | 2/2007 | Oppenheimer | A47J 37/00 |
| | | | 219/386 |
| 8,276,505 B2 | 8/2012 | Buehler | |
| 10,376,097 B1* | 8/2019 | Seitz | A47J 37/06 |
| 2001/0032546 A1* | 10/2001 | Sharpe | A23L 1/00 |
| | | | 99/331 |
| 2006/0085258 A1 | 4/2006 | Sharpe | |
| 2006/0260472 A1* | 11/2006 | Tarlow | A47J 37/08 |
| | | | 99/395 |
| 2006/0289459 A1 | 12/2006 | Schmidt et al. | |
| 2008/0257169 A1* | 10/2008 | Tienor et al. | A47J 37/06 |
| | | | 99/377 |
| 2010/0012639 A1* | 1/2010 | Merrell et al. | A47J 27/00 |
| | | | 219/201 |
| 2010/0051603 A1 | 3/2010 | Powell | |
| 2014/0272037 A1 | 9/2014 | Frenkil, Sr. | |
| 2016/0198898 A1* | 7/2016 | Steeb | A47J 37/06 |
| 2017/0020324 A1* | 1/2017 | Young et al. | A47J 27/10 |
| 2018/0055281 A1 | 3/2018 | Kessell | |
| 2018/0125293 A1* | 5/2018 | McNerney et al. | A47J 37/06 |
| 2020/0196646 A1 | 6/2020 | Gildersleeve et al. | |

OTHER PUBLICATIONS

Machine translation of KR 101965359 B1 performed on Oct. 31, 2023, Lim et al. (Year: 2019).*

WIPO: "Notification of Transmittal of the International Search Report and the Written Opinion of the International Searching Authority, or the Declaration"; dated Dec. 17, 2020; (ISA 220 210 & 237 in related PCT Application).

* cited by examiner

AUTOMATIC EGG COOKER

CROSS-REFERENCE TO RELATED APPLICATION(S)

This application claims the benefit of U.S. Provisional Patent Application Ser. No. 62/899,815, filed Sep. 13, 2019, the entirety of which is hereby incorporated herein by reference.

BACKGROUND OF THE INVENTION

1. Field of the Invention

The present invention relates to cooking devices and, more specifically, to a device for cooking eggs.

2. Description of the Related Art

Cooking eggs to achieve a precise level of firmness can be difficult, especially in a restaurant setting in which several orders are being prepared simultaneously. Common egg styles include "over hard"—a style in which the egg has been cooked on both sides and in which the yoke is substantially solidified, "over medium"—in which the yoke is soft, but not runny, and "over easy"—in which the yoke is mostly runny. Customers also frequently request "sunny-side-up" eggs and omelets. Failing to get the correct firmness can result in either customer dissatisfaction, return of the order to the kitchen and (in many cases) both.

Restaurants that serve breakfast often seek to hire cooks with substantial egg cooking experience. Given that cooking eggs at restaurant scale with sufficient precision to ensure that the eggs are cooked to the customer's preferences requires considerable skill, skilled egg cooks tend to be hired away from restaurants at a high rate. This can cause a serious disruption in a restaurant's operations, a loss of customer loyalty and a loss of profit.

Therefore, there is a need for device that cooks eggs automatically to a customer's preference with precision.

SUMMARY OF THE INVENTION

The disadvantages of the prior art are overcome by the present invention which, in one aspect, is an egg cooking device for cooking eggs in a pan having a bottom for use by a user. The device includes a frame, a support unit, a first burner, a top unit, a second burner, a motor unit and a control unit. The support unit is rotationally coupled to the frame and defines a first recess that is complementary in shape to the bottom of the pan so as to receive a portion of the pan therein. The first burner is disposed adjacent to the first recess. The top unit is hingedly attached to the support unit and defies a downwardly depending second recess therein that opens to the pan when the pan is placed in the support unit. The second burner is disposed adjacent to the second recess. The motor unit is affixed to the frame and is configured to rotate the pan in response to a command. The control unit receives a desired recipe input from a user interface and generates a plurality of commands that cause the motor unit, the first burner and the second burner to operate according to the desired recipe indicated by the input from the user interface.

In another aspect, the invention is an egg cooker for cooking with a pan having a bottom that includes a frame. A support unit defines a recess that is complementary in shape to the bottom of the pan and is configured to receive the pan therein. The support unit is coupled to an axle that is supported by the frame. Rotation of the axle causes rotation of the support unit. A first burner is disposed in the support unit adjacent to the recess. A top unit has a circumferential wall extending downwardly from a substantially flat cooking surface. The wall and the cooking surface define a pan-shaped void therein. The top unit is attached to the support unit adjacent to the frame by a hinge so that the top unit pivots so as to open and release the pan when an upward force is applied thereto. A second burner is disposed adjacent to the cooking surface of the top unit. A motor unit is supported by the frame and is coupled to the axle. The moto unit is configured to rotate the support unit, the first burner, the top unit and the second burner 180° so that the pan is upside-down and so that the cooking surface of the top unit is below the pan when subjected to a first activation. The motor unit is also configured to rotate the support unit, the first burner, the top unit and the second burner 180° so that the pan is right-side-up and so that the pan is below the cooking surface of the top unit when subjected to a second activation, different from the first activation. A user interface is configured to receive an egg cooking command from the user and to generate at least one alert to the user. A control unit is electrically coupled to the user interface and controls the first burner, the second burner and the motor unit so as to cause the first burner, the second burner and the motor unit to execute a recipe corresponding to the egg cooking command and so as to cause the user interface to generate the at least one alert upon completion of the execution of the recipe. A locking mechanism is controlled by the control unit and selectively locks the top unit in a closed position so that the locking mechanism is locked during execution of the recipe and so that the locking mechanism is unlocked upon completion of the recipe. A spring is attached to the top unit and to the support unit that applies an opening force to the top unit. The opening force is sufficient to cause the top unit to pivot into an opened position when the locking mechanism is unlocked.

In yet another aspect, the invention is a method of cooking eggs using a device having user interface that sends information to a control unit that controls a position of a pan with a motor in which the pan is heated, in which an input is received from the user interface indicating a desired style of egg. A routine specific to the desired style of egg that causes the pan to be in a first position for an amount of time necessary to cook the egg to the desired style is executed on the control unit. A human-perceptible alert is generated after the routing has completed.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
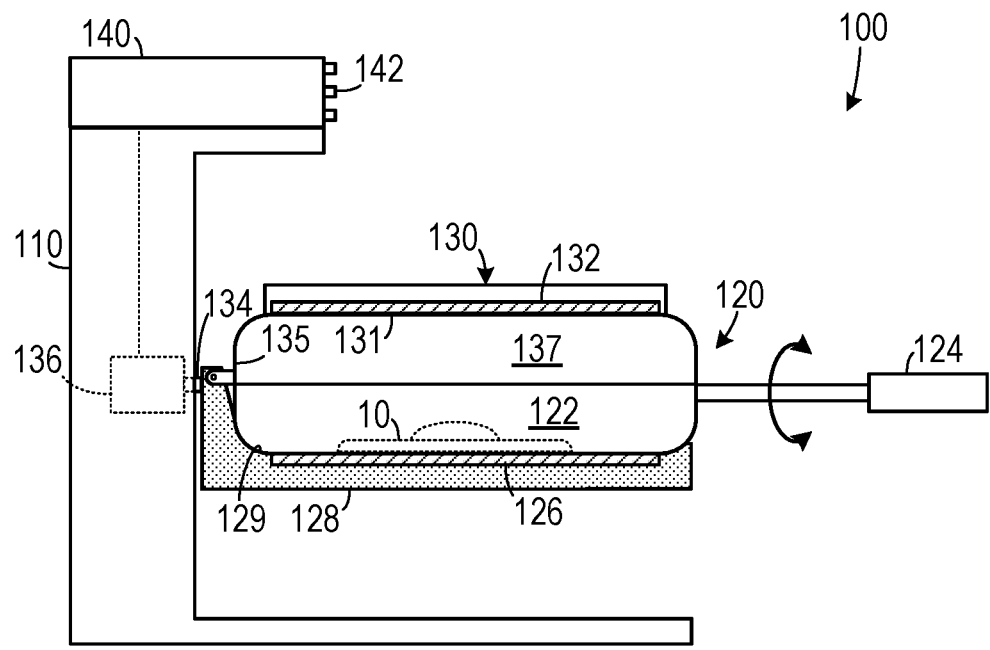
FIG. 1A-1C are a series of schematic diagrams showing one representative device for cooking eggs in operation.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1A, one representative embodiment of an automatic egg cooking device 100 includes a frame 110 to which an egg cooking unit 120 is affixed. The egg cooking unit 120 includes a removable pan 122, which has a handle 124 extending therefrom, and a complimentary top unit 130, which may have a shape that is similar to that of the pan 122. The top unit 130 has a circumferential wall 135 that extends downwardly from a substantially flat cooking surface 131. The wall 135 and the cooking surface 131 define a pan-shaped void 137 therein.

A support unit 128 supports a first burner 126 (such as an electric burner in one embodiment; other embodiments could use other types of heating devices known to the cooking arts) on which the pan 122 rests and that heats the pan 122. The support unit 128 defines a recess 129 complementary in shape to the bottom of the pan 122 on which it rests. A second burner 132 is affixed to the top unit 130 to heat it.

The pan 122, the top portion 132, the support member 128, the first burner 126, and the second burner 132 are rotatable together around a pivoting axle 134 so as to allow an egg 10 (or a plurality of eggs) cooking in the pan 122 to be flipped over by 180° and cooked in the top portion 132. In one embodiment, both the pan 122 and the cooking surface 131 of the top unit 130 are coated with a restaurant-quality non-stick surface of a type commonly used in egg cookery.

In a fully automatic embodiment, a motor unit 136 that is affixed to the frame 110 is controlled by a control unit 140 that is configured to rotate the support unit 128, the pan 122 and the top unit 130 at appropriate times for cooking the egg 10 to the desired firmness. The control unit 140 can include a plurality of input buttons on a control user interface 142 or knobs that allow the user to input a desired cooking style. The control unit 140 also includes a processor or micro-controller that embodies count-down timers and any relays necessary to control the motor unit 136 and to deliver power to burners 126 and 132. Alternate embodiments can employ an analog control unit.

Figure 1B:
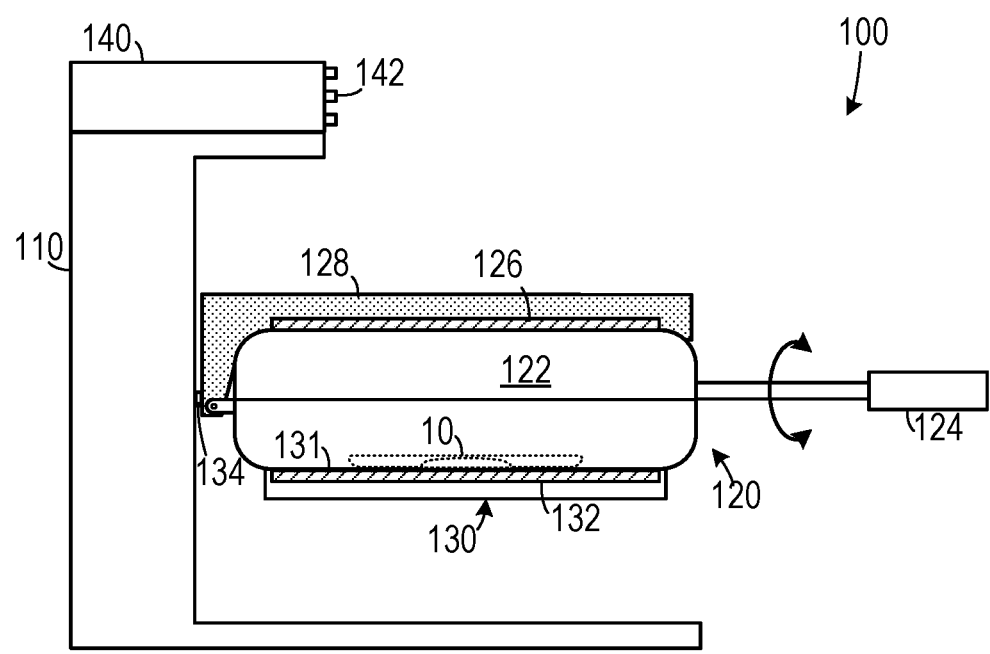
Figure 1C:
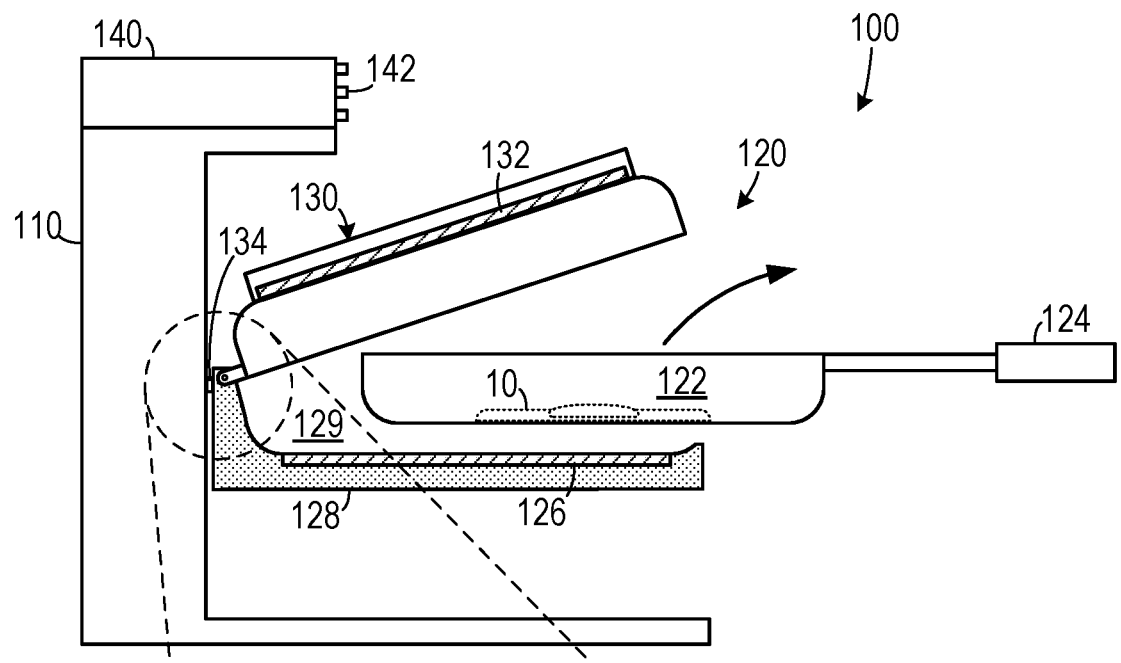
Figure 1C:
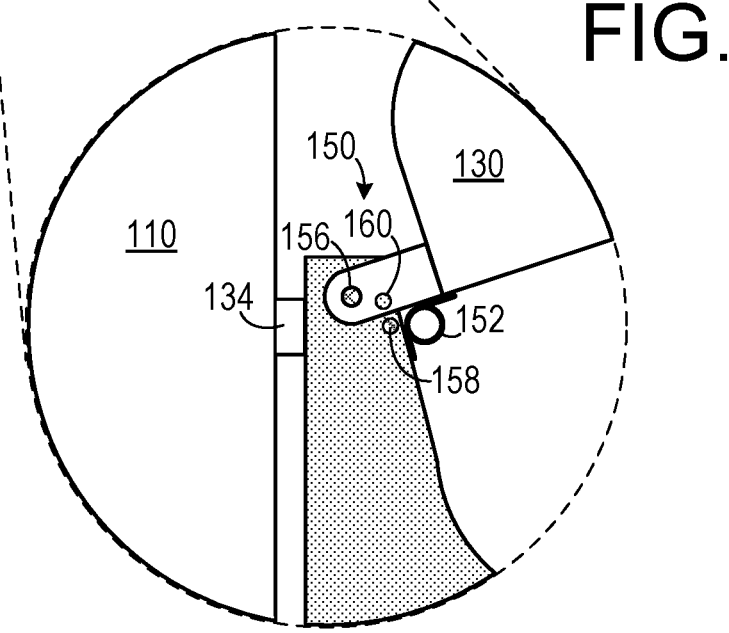

In use, as shown in FIG. 1A, the cook places an egg 10 in the pan 122 and places it into the recess 129 onto the first burner 126. Then the cook presses a selected indicator button on the control user interface 142 of the electronics unit 140, which indicates the desired firmness of the egg 10. The electronics unit 140 turns on the first burner 132 and starts a timer in the micro-controller (alternatively, the burners can remain turned on during an entire cooking session), which counts down the time for the bottom side of the egg 10 to be cooked in the first position. At the expiration of that time, the electronics unit 140 causes the motor unit 136 to rotate the support unit 128, the pan 122 and the top unit 130 into the position shown in FIG. 1B, thereby flipping the egg 10. The second burner 132 then heats the cooking surface 131 of the top portion 130 (now on the bottom) so as to cook the top side of the egg 10 and starts a new timer that expires when the egg 10 has been cooked in the second position for the correct amount of time. Once the second timer has expired, as shown in FIG. 1C, the pan 122 is flipped back into the first position, the pan 122 is slid out from the first burner 126 and the egg is placed on a plate (not shown) for service to the customer.

When the second timer expires, the electronics unit 140 also generates and indication that the egg 10 is done. Such an indication can take the form of a light (e.g., a blinking LED), an audible alarm (e.g., a bell or buzzer sound), or both. In a fully automatic embodiment, the electronics/control unit 140 can cause the top portion 130 to open automatically, as shown in FIG. 1C. This can be accomplished, as shown in the detail of FIG. 1C with a locking/opening unit 150. The locking/opening unit 150 can include a spring 152 for tilting the top portion 130 upwardly from a hinge 156 that is affixed to the frame 110 and an engagement device that locks the top portion 130 into a down position during cooking and releases it once the egg 10 is done. This can be accomplished with a solenoid-controlled locking key 158 that fits into a slot 160 in the frame 110 to lock the top portion 130 into position and that is pulled out of the slot 160 to release the top portion 130.

Figure 2A:
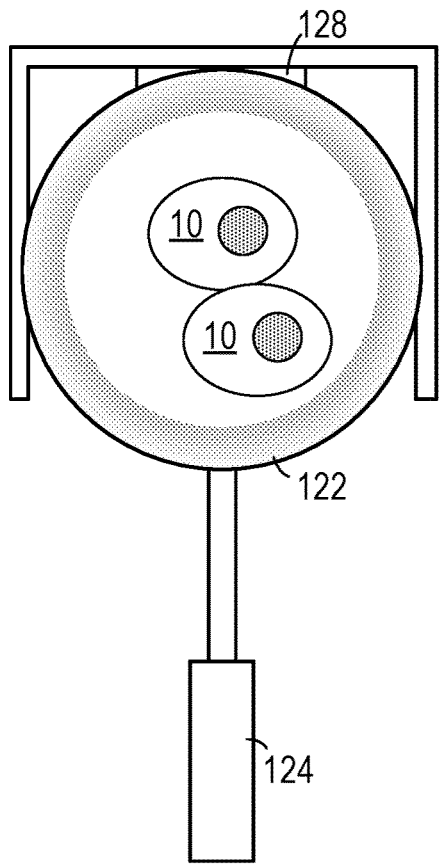
FIG. 2A is a schematic diagram showing a top plan view of a pan and rail in which the pan is in the cooking position.
Figure 2B:
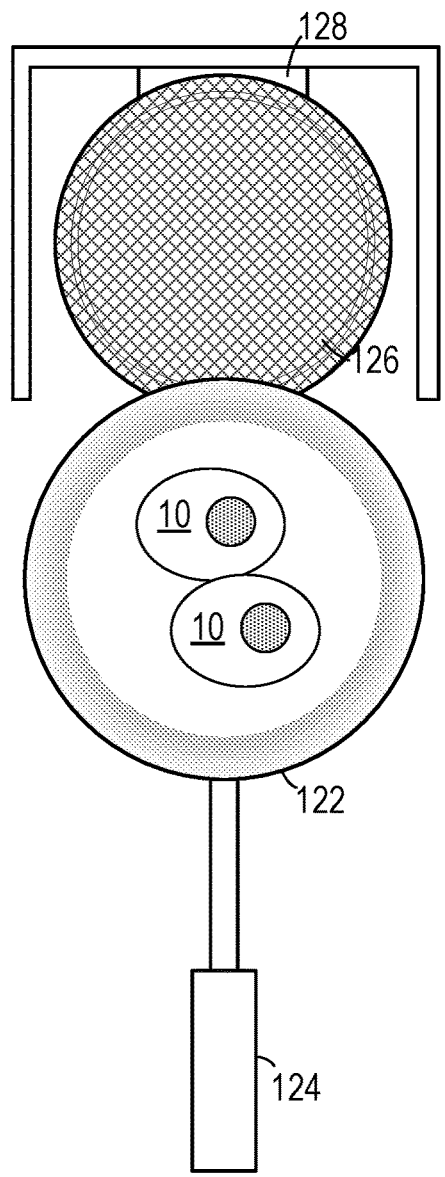
FIG. 2B is a schematic diagram showing a top plan view of a pan and rail in which the pan is in the retracted position.

In an alternate embodiment, the flipping of the egg cooking unit 120 and the removal of the pan 122 is done manually with the electronics/control unit 140 providing only indicators as to when the egg 10 should be flipped. If the cook selects a "sunny-side-up" option, then the pan is not flipped and a timer counts down the time necessary to cook the egg before opening the unit. A top view of the pan 122 without the electronics/control unit is shown in the cooking position in FIG. 2A and in the retracted position in FIG. 2C.

Figure 3A:
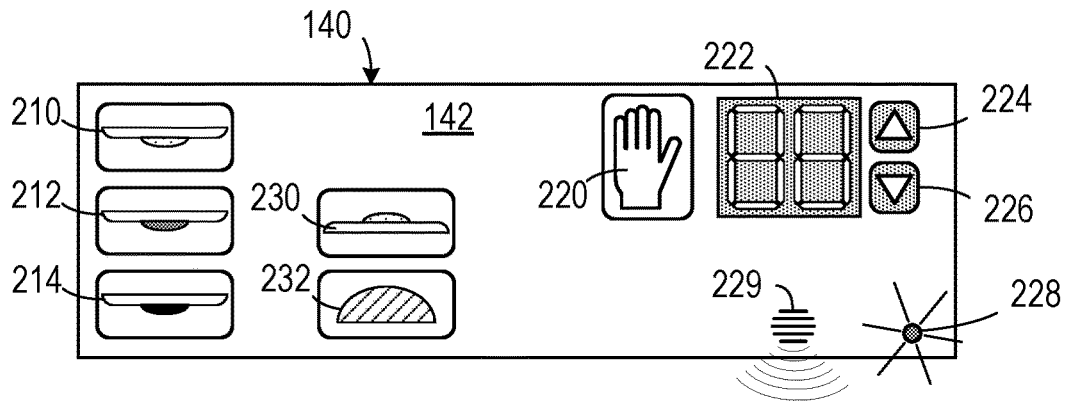
FIGS. 3A-3B are schematic diagrams of two configurations of a control panel user interface used in association with the device shown in FIGS. 1A-1C.
Figure 3B:
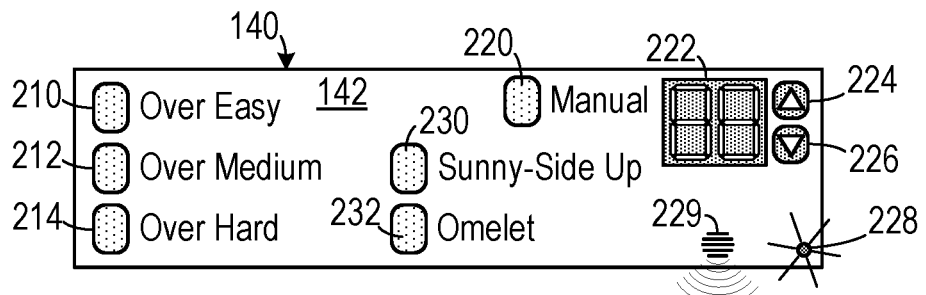

As shown in FIG. 3A, the control user interface 142 can include buttons for each desired cooking style. For example, it can include an "over easy" button 210, an "over medium" button 212, an "over hard" button 214. It may also include a manual override button 220 that allows the cook to enter a selected amount of time on a screen 222 using "add time" 224 and "subtract time" 226 buttons for custom cooking times. Additional inputs can be added for things such as sunny-side up 230 and omelet 232 cooking. The buttons can have images indicating the desired style of eggs or, as shown in FIG. 3B, they can include text describing the style next to the buttons (or they can include both images and text).

Temperature controls (not shown) may also be added to set the desired cooking temperatures of the burners. Also, the control user interface 142 can include an indicator light 228 that lights up when the egg is cooked. Additionally, a sound generator 229 can generate sounds (such as bells or beeps) to indicate when an egg is done or when it is to be flipped, etc.

Figure 4A:
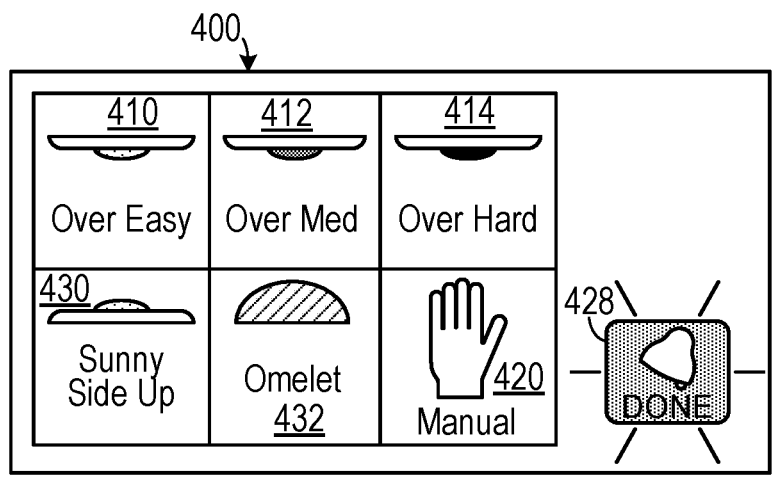
FIGS. 4A-4B are schematic diagrams of a touch screen configuration of a control panel user interface used in association with the device shown in FIGS. 1A-1C.
Figure 4B:
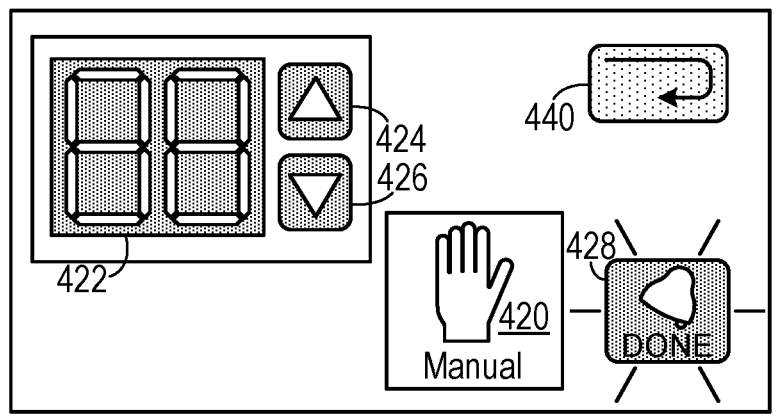

As shown in FIGS. 4A and 4B, the user interface can be embodied as a touch screen 400 and include a computer generated graphic user interface with a plurality of image buttons, such as an image button for selecting over easy 410, an over medium image button 412, an over hard image button 414, a sunny-side-up image button 430, an omelet image button 432 and a manual mode select image button 420. The touch screen can also generate a "done" image 428, which in some embodiments can flash on and off, in concert with an audible alarm when the eggs are fully cooked to the desired firmness. When the manual mode select image button 420 is touched by the user, the control unit can generate screen, as shown in FIG. 4B, with a timer image 422, an increase time image button 424 that allows a user to increase the amount of time on the timer image 422 and a decrease time image button 426 that allows the user to decrease the cooking time. This screen can also include a "return" mode image button 440 that causes the control unit to return the screen to the images shown in FIG. 4A. The touch screen offers the ability to change the user interface by changing the control unit software.

Figure 5:
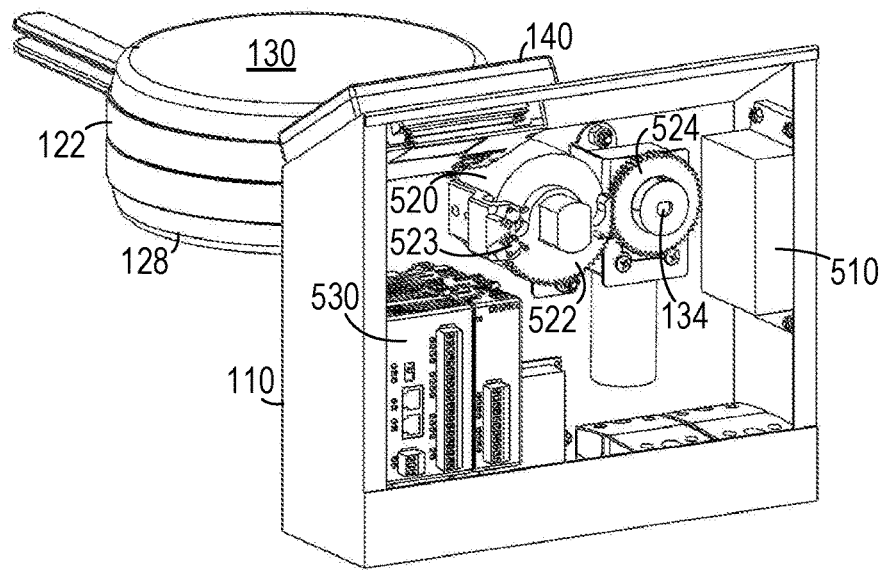
FIG. 5 is rear perspective view of the device with an open back panel showing items supported by the frame.

The inside of an enclosure supported by the frame 110 is shown in FIG. 5. This shows one embodiment of a motor unit 520 that rotates a first gear 522. The first gear is enmeshed with a second gear 524 that rotates the axle 134. The motor unit 520 is controlled by the control unit 530, which is powered by a power supply 510. A micro-switch 523 can be used to provide positional feedback to the control unit 530.

Figure 6A:
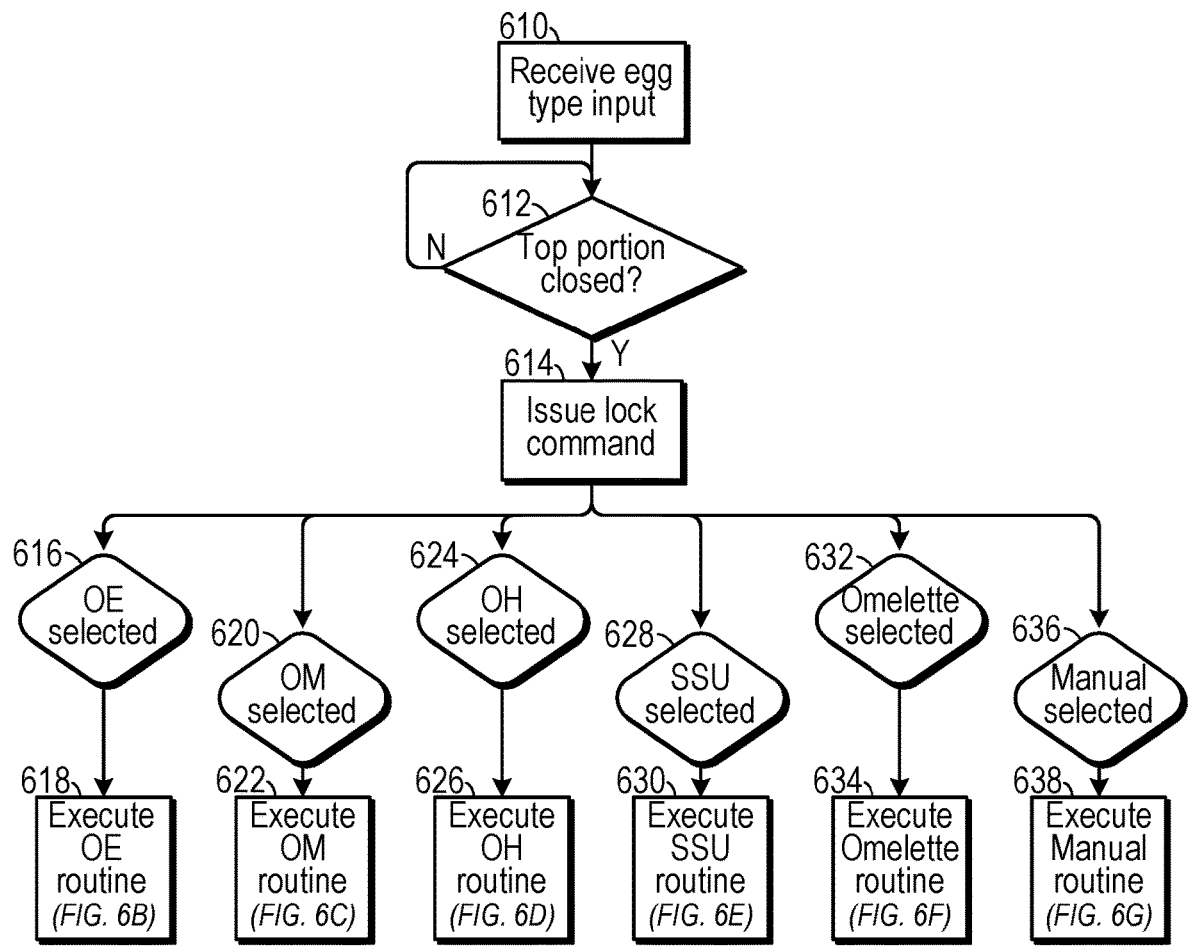
FIGS. 6A-6G are flow charts showing one method of cooking eggs with an automatic egg cooking device.
Figure 6B:
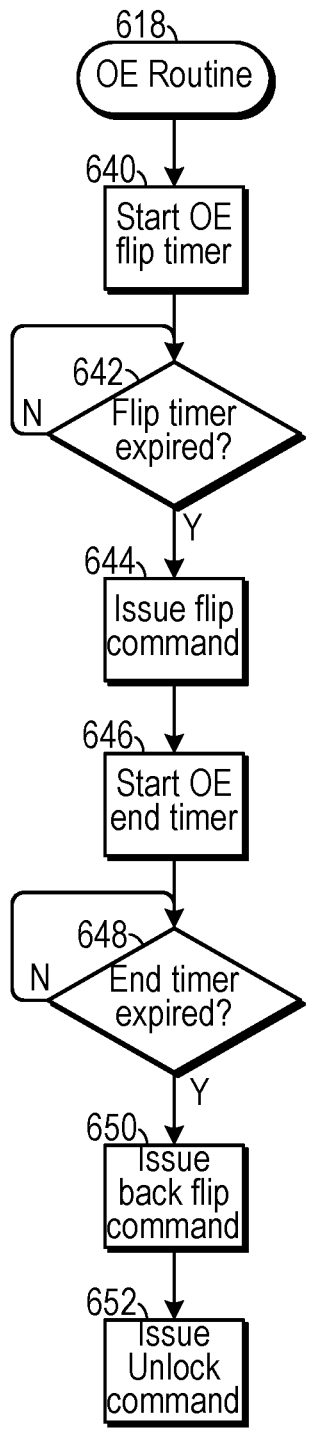
Figure 6C:
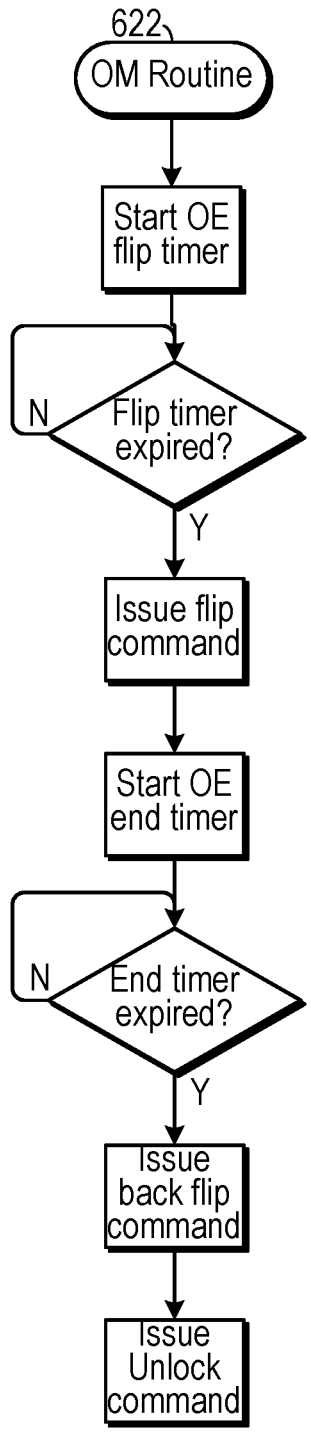
Figure 6D:
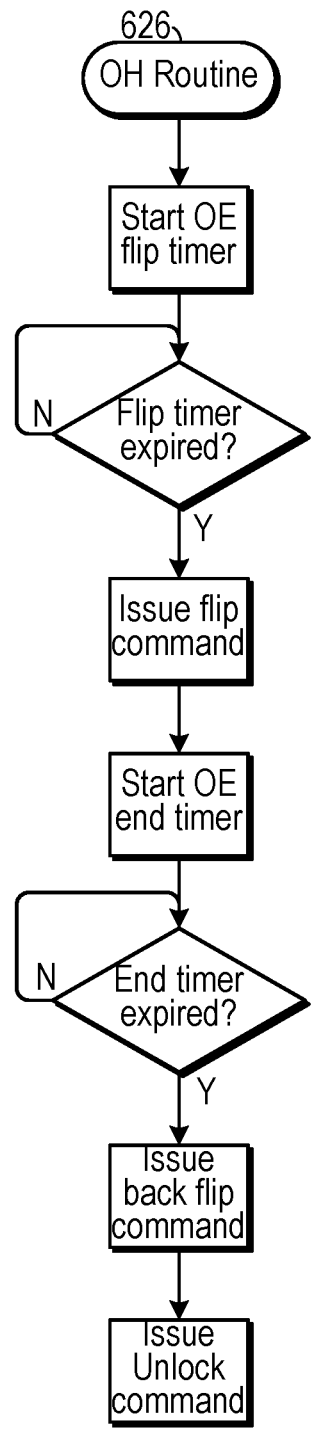
Figure 6E:
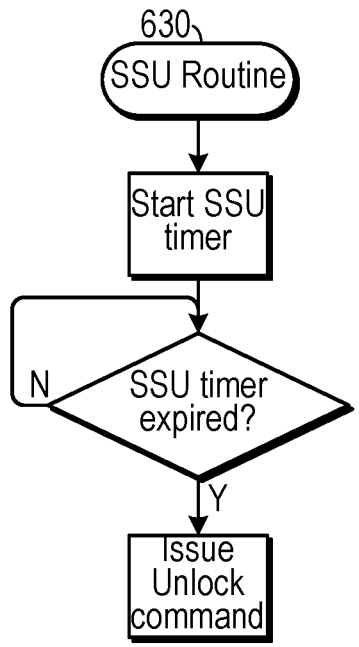
Figure 6F:
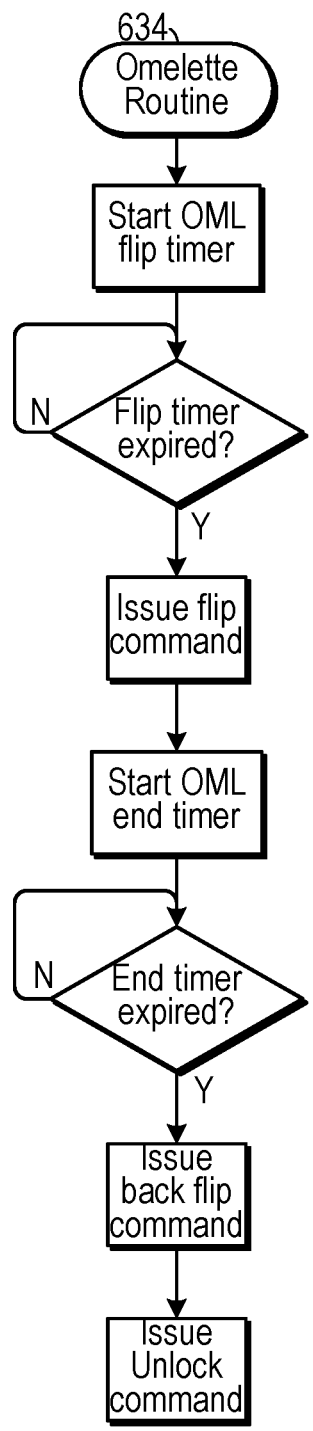
Figure 6G:
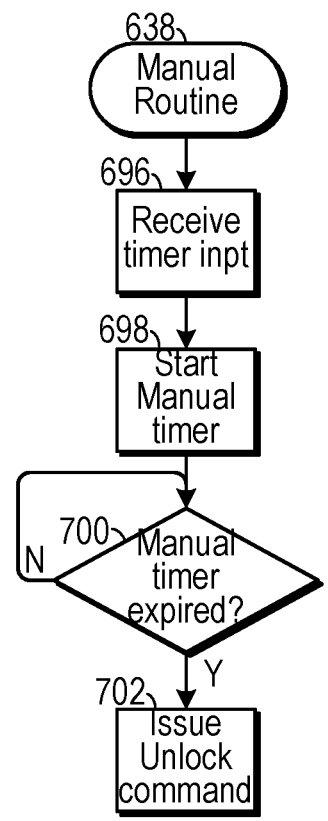

As shown in FIGS. 6A-6G, in one method of cooking eggs, the control unit executes a program controlling the system that begins with the user inputting the desired egg style into the user interface 610, which causes the system to select a routine that executes a cooking recipe corresponding to the selected style. The control unit determines if the top unit is closed 612 (which can be done by sensing feedback from a microswitch positioned to sense closure of the top unit) and issues a locking command 614 to the opening/locking unit (item 150 in FIG. 1C). If "over easy" is selected 616 by the user, the system enters an "over easy" recipe cooking routine 618, as shown in FIG. 6B, in which a first timer is started 640, which counts down an amount of time that the egg is to be cooked before being flipped. The amount of time depends on the temperature at which the burner is set, which is a user preference and can be determined easily through a few test runs of the system. If the first timer has expired 642, then the control unit instructs the motor unit to flip the egg cooking unit 644 and starts a second timer 646 that is set to an amount of time that the egg is to be cooked after flipping (again, the amount of time depends on the user-preferred cooking temperature). Once the second timer expires 648, then a command to flip the egg cooking unit to its original position is issued 650 and an unlock command is issued 652 to cause the egg cooking unit to open and allow the user to remove the pan. A similar "over medium" routine 622 is executed when the user selects the "over medium" option, as shown in FIG. 6C, with the first and second timers being set to values that will achieve eggs being cooked over medium. A similar routing 626 is employed for over hard eggs, as shown in FIG. 6D. A simpler routine 630 is executed for sunny-side-up eggs, as shown in FIG. 6E, as this style does not require that the cooking unit be flipped. The omelet coking routine 634 is shown in FIG. 6F. In the manual mode routine 638, the control unit receives user input 696 indicating the amount of time the eggs are to cook and this amount of time is loaded into the timer. The timer is started 698 and once it expires 700 the unlock command is issued 702.

While the system disclosed above can cook eggs in many styles, in certain embodiments it can be programmed for the cooking of things like grilled cheese sandwiches and other food items.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An egg cooking device for cooking eggs for use by a user, comprising:
   (a) a frame;
   (b) a pan having a flat bottom, an edge and a handle configured to allow the user to hold the pan while the pan is hot;
   (c) a support unit that is rotationally coupled to the frame and that defines a first recess that is complementary in shape to the bottom of the pan so as to receive a portion of the pan therein;
   (d) a first burner disposed adjacent to the first recess;
   (e) a top unit having a shape that mirrors the pan and that includes a flat cooking surface, the top unit being hingedly attached to the support unit and defining a downwardly depending second recess therein that opens to the pan when the pan is placed in the support unit, the top unit having an open position and a closed position wherein the pan is removable from the first recess when the top unit is in the open position, wherein the top unit directly touches the edge of the pan so as to act as a cover for the pan that leaves no gaps between the top unit and the pan when in the closed position;
   (f) a second burner disposed adjacent to the second recess;
   (g) a motor unit, affixed to the frame, that is configured to rotate the pan when the top unit is in the closed position in response to a command so that the eggs cook on the flat bottom surface of the top unit; and (h) a control unit that receives a desired recipe input from a user interface and that generates a plurality of commands that cause the motor unit, the first burner and the second burner to operate according to the desired recipe indicated by the input from the user interface, the control unit configured to cause the pan and the top unit to rotate to a position in which the top unit is above the pan and to cause the top unit to open to the open position so as to allow removal of the pan with the eggs in the pan from the first recess by the user by grasping the handle of the pan when the desired recipe is completed.

2. The egg cooking device of claim 1, further comprising a locking mechanism that is controlled by the control unit and that selectively locks the top unit so that the top unit is secured to the pan during execution of the recipe and so that the top unit is released from the pan upon completion of the recipe.

3. The egg cooking device of claim 2, further comprising a spring attached to the top unit and to the support unit that applies an opening force to the top unit, the opening force being sufficient to cause the top unit to pivot into an opened position when the locking mechanism is not locked.

4. The egg cooking device of claim 1, further comprising a mechanism, responsive to the control unit, for generating at least one alert indicating that the desire recipe is complete and wherein the at least one alert is selected from a list consisting of: a flashing light, a video icon, a buzzer, a bell, an audio alarm, and combinations thereof.

5. The egg cooking device of claim 1, wherein user interface includes a plurality of buttons, each button corresponding to a different one of a plurality of egg cooking recipes.

6. The egg cooking device of claim 5, wherein the egg cooking recipes including recipes selected from a list consisting of: over-easy eggs, over-medium eggs, over hard eggs, sunny side up eggs and omelets.

7. The egg cooking device of claim 5, wherein each of the plurality of buttons includes a graphic image corresponding to the different one of a plurality of egg cooking recipes.

8. The egg cooking device of claim 1, wherein user interface further includes a manual input with which the user manually enters a cooking time.

9. The egg cooking device of claim 1, wherein the motor unit comprises:
(a) a first gear;
(b) a motor electrically coupled to the control unit and mechanically coupled to the first gear;
(c) a second gear engaged with the first gear and rotationally coupled to the axle; and
(d) a stopping mechanism that constrains the second gear to rotate a maximum of 180°.

10. The egg cooking device of claim 9, wherein the stopping mechanism comprises at least one microswitch that indicates to the control unit when the motor has caused a 180° rotation of the first gear.

11. The egg cooking device of claim 9, wherein the control unit is programmed to reverse a rotational direction of the motor from a previous rotational direction of the motor each time the motor causes rotation of the first gear.

12. An egg cooker for cooking with a pan having a bottom, an edge and a handle, comprising:
(a) a frame;
(b) a support unit that defines a recess that is complementary in shape to the bottom of the pan and configured to receive the pan therein, the support unit coupled to an axle that is supported by the frame, wherein rotation of the axle causes rotation of the support unit;
(c) a first burner disposed in the support unit adjacent to the recess;
(d) a top unit having a circumferential wall extending downwardly from a substantially flat cooking surface, wherein the wall and the cooking surface define a pan-shaped void therein that mirrors the pan, the top unit attached to the support unit adjacent to the frame by a hinge so that the top unit pivots so as to open and release the pan when an upward force is applied thereto, the top unit having an open position and a closed position wherein the pan is removable from the recess only when the top unit is in the open position, wherein the top unit directly touches the edge of the pan so as to act as a cover for the pan that leaves no gaps between the top unit and the pan when in the closed position;
(e) a second burner disposed adjacent to the cooking surface of the top unit;
(f) a motor unit supported by the frame and coupled to the axle, the motor moto unit configured to rotate the support unit, the first burner, the top unit and the second burner 180° when the top unit is in the closed position so that the pan is upside-down and so that the cooking surface of the top unit is below the pan when subjected to a first activation, the motor unit configured to rotate the support unit, the first burner, the top unit and the second burner 180° so that the pan is right-side-up and so that the pan is below the cooking surface of the top unit when subjected to a second activation, different from the first activation;
(g) a user interface configured to receive an egg cooking command from the user and to generate at least one alert to the user;
(h) a control unit that is electrically coupled to the user interface and that controls the first burner, the second burner and the motor unit so as to cause the first burner, the second burner and the motor unit to execute a recipe corresponding to the egg cooking command and so as to cause the user interface to generate the at least one alert upon completion of the execution of the recipe;
(i) a locking mechanism that is controlled by the control unit and that selectively locks the top unit in a closed position so that the locking mechanism is locked during execution of the recipe and so that the locking mechanism is unlocked upon completion of the recipe; and
(j) a spring attached to the top unit and to the support unit that applies an opening force to the top unit, the opening force being sufficient to cause the top unit to pivot into an opened position when the locking mechanism is unlocked, wherein, the control unit is configured to cause the pan and the top unit to rotate to a position in which the top unit is above the pan and to cause the top unit to open to the open position so as to allow removal of the pan with the eggs in the pan from the first recess by the user by grasping the handle of the pan when the desired recipe is completed.

13. The egg cooker of claim 12, wherein the at least one alert is selected from a list consisting of: a flashing light, a video icon, a buzzer, a bell, an audio alarm, and combinations thereof.

14. The egg cooker of claim 12, wherein user interface includes a plurality of buttons, each button corresponding to a different one of a plurality of egg cooking recipes and wherein the egg cooking recipes including recipes selected from a list consisting of: over-easy eggs, over-medium eggs, over hard eggs, sunny side up eggs and omelets.

15. The egg cooking device of claim 14, wherein each of the plurality of buttons includes a graphic image corresponding to the different one of a plurality of egg cooking recipes.

16. The egg cooker of claim 12, wherein user interface further includes a manual input with which the user manually enters a cooking time to the control unit, wherein the control unit generates the at least one alert when the cooking time is reached.

* * * * *